United States Patent
Deylitz et al.

(10) Patent No.: US 7,064,283 B2
(45) Date of Patent: Jun. 20, 2006

(54) DEVICE FOR FIXING A POWER CIRCUIT BREAKER IN AN INSERTION RACK

(75) Inventors: Erhard Deylitz, Berlin (DE); Michael Kruschke, Schwante (DE); Kathrina Marek, Zepernick (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 10/532,218

(22) PCT Filed: Aug. 28, 2003

(86) PCT No.: PCT/DE03/02884

§ 371 (c)(1),
(2), (4) Date: Apr. 22, 2005

(87) PCT Pub. No.: WO2004/040726

PCT Pub. Date: May 13, 2004

(65) Prior Publication Data

US 2006/0037846 A1 Feb. 23, 2006

(30) Foreign Application Priority Data

Oct. 24, 2002 (DE) .............................. 102 50 214

(51) Int. Cl.
*H01H 9/00* (2006.01)
(52) U.S. Cl. .................................. 200/50.21
(58) Field of Classification Search .. 200/50.21–50.26; 361/605–609, 615
See application file for complete search history.

(56) References Cited

U.S. PATENT DOCUMENTS

| 2,273,001 | A | | 2/1942 | Mahoney et al. |
| 4,202,027 | A | * | 5/1980 | Ericson ...................... 361/608 |
| 5,837,949 | A | * | 11/1998 | Green et al. ............. 200/50.21 |
| 6,005,208 | A | * | 12/1999 | Castonguay ................ 200/308 |
| 6,864,444 | B1 | * | 3/2005 | Anger et al. ............. 200/50.21 |
| 6,884,949 | B1 | * | 4/2005 | Yoon ....................... 200/50.26 |

FOREIGN PATENT DOCUMENTS

| DE | 35 44 227 A1 | 6/1987 |
| DE | 92 12 149 U1 | 3/1994 |
| DE | 100 06 427 C2 | 8/2001 |

* cited by examiner

*Primary Examiner*—Michael A. Friedhofer
(74) *Attorney, Agent, or Firm*—Harness, Dickey & Pierce (57) ABSTRACT

A device is for fixing a circuit breaker in an insertion rack. The device includes at least one arresting unit which is connected to the insertion rack and belongs to the power circuit breaker. The arresting unit is connected to a control rod which is movably arranged on the insertion rack in such a way that it is displaceable from a locking position to an unlocking position and vice-versa. The control rod interacts with a system which moves the power circuit breaker in relation to the insertion rack. The device also includes a release device which can be displaced from the locking position of the control rod to the releasing position thereof and vice-versa by way of the power circuit breaker.

19 Claims, 6 Drawing Sheets

DEVICE FOR FIXING A POWER CIRCUIT BREAKER IN AN INSERTION RACK

This application is the national phase under 35 U.S.C. § 371 of PCT International Application No. PCT/DE2003/002884 which has an International filing date of 28 Aug. 2003 (28.08.2003), which designated the United States of America and which claims priority on German Patent Application number DE 102 50 214.5 filed 24 Oct. 2002 (24.10.2002), the entire contents of which are hereby incorporated herein by reference.

FIELD OF THE INVENTION

The invention generally relates to an apparatus for fixing a power circuit breaker in a withdrawable-part or insertion rack. It more specifically may relate to one having a device for moving the power circuit breaker relative to the withdrawable-part or insertion rack and at least one locking device, associated with the withdrawable-part rack, for the power circuit breaker. The locking device may be connected to a control rod, arranged movably on the withdrawable-part rack, for the purpose of moving it from a latched position to an unlatched position or vice versa.

BACKGROUND OF THE INVENTION

A power circuit breaker, which can be moved into a withdrawable-part or insertion rack, is shown, for example, in DE 35 44 227 A1. In a similar manner, high-voltage power circuit breakers in the medium-voltage range can also be moved by them being placed on a carriage, which can be moved by way of a crankshaft drive, cf. for example DE 100 06 427 C2.

Power circuit breakers, which can be inserted in a withdrawable-part rack, need to be able to be fixed in the withdrawable-part rack, in particular in the case of very high short-circuit currents. This is done in order to be able to ensure functional reliability during operation of the power circuit breaker.

As a result of the arrangement of the current path in the power circuit breaker, forces result which would produce a torque about the insertion shaft and would thus push the power circuit breaker out of the withdrawable-part rack if insufficient fixing were provided. As a result, the region of overlap between the insertion blades of the power circuit breaker in the isolating contact systems of the withdrawable-part rack would be reduced or eliminated. The formation of an arc associated with this may result in failure or destruction of the device.

In order to be able to fix the power circuit breaker securely in the withdrawable-part rack, it is known to latch the power circuit breaker in the withdrawable-part rack by way of a latching apparatus. In this case, holding systems are known which lock the power circuit breaker using relatively short lever arms. If a strong force is introduced, the power circuit breaker accordingly tends towards tipping movements, with the result that the mentioned disadvantages occur.

DE 92 12 149 U1 also discloses a device for fixing a power circuit breaker provided with a partition plate and in which a blocking lever, which is fixed on the withdrawable-part rack, can be brought by hand into a latched or an unlatched position, and the power circuit breaker is fixed in the latched position by way of a locking hook. The locking hook prevents a possible tipping movement of the power circuit breaker.

Analogous locking for a withdrawable-part rack equipped with a device for inserting the power circuit breaker does not, however, have to be undertaken by hand, which would then have the hidden risk of locking being forgotten.

SUMMARY OF THE INVENTION

It is an object of an embodiment of the present invention to provide an apparatus for fixing a power circuit breaker in a withdrawable-part rack. The apparatus fixes the power circuit breaker securely in the withdrawable-part rack, even in the event of very high forces and which acts automatically, i.e. without any additional effort on the part of the operator, when the power circuit breaker is inserted in the withdrawable-part rack.

According to an embodiment of the invention, an object may be achieved by an apparatus for fixing a power circuit breaker in a withdrawable-part rack. For this purpose, the control rod interacts with the device for moving the power circuit breaker relative to the withdrawable-part rack. Further, the apparatus includes a release device, which can be moved by way of the movement of the power circuit breaker from a blocked position for the control rod to a released position for the control rod or vice versa.

As such, the locking device moves to the unlatched position when the power circuit breaker is inserted and withdrawn from the withdrawable-part rack, and the control rod is held in the blocked position by the release device. Further, when the power circuit breaker is inserted in the withdrawable-part rack, the released position for the control rod for triggering the movement of the locking device to the latched position is assumed by the release device only shortly before the inserted position of the power circuit breaker.

The apparatus according to an embodiment of the invention for fixing a power circuit breaker in a withdrawable-part rack advantageously makes it possible for the power circuit breaker to be locked in a simple and secure manner. As a result of the fact that this apparatus interacts with a device for moving the power circuit breaker relative to the withdrawable-part rack, it is particularly advantageous to fix the power circuit breaker as a result of the movement of the power circuit breaker into the withdrawable-part rack and also to unlatch the power circuit breaker owing to the withdrawal of the power circuit breaker from the withdrawable-part rack. Thus, no additional procedures by an operator are required for fixing the power circuit breaker.

This is desirable, inter alia, since the additional latching of the power circuit breaker could be forgotten or carried out erroneously.

In one preferred embodiment, the locking device is in the form of a hook. Furthermore, the locking device is advantageously mounted on the withdrawable-part rack such that it can rotate and is arranged such that it can engage in an attachment locked on the power circuit breaker. The bearing point is in this case selected such that, on the action of tipping forces which are produced owing to the arrangement of the current path in the power circuit breaker, a closing moment of the locking device in the attachment of the power circuit breaker and thus on the power circuit breaker is always set.

In one particularly preferred embodiment, the locking device is a downwardly formed hook, which engages in an insert arranged in a force-fitting manner on the power circuit breaker and thus holds the power circuit breaker securely in the withdrawable-part rack even in the event of high forces.

The control rod is advantageously arranged on a side wall of the withdrawable-part rack and is connected in a force-fitting manner to the locking device by way of a bolt, a sliding piece and a spring. Furthermore, the control rod which is advantageously arranged such that it can move vertically has a spring applied to it which prestresses the control rod. The device for moving the power circuit breaker relative to the withdrawable-part rack may include a displacement mechanism having a crank handle and an insertion shaft having a crankshaft journal. The release device is advantageously a transverse slide having a blocking tab which can be latched into a notch in the control rod. The transverse slide also advantageously has a spring force applied to it.

In the initial position in which the power circuit breaker is still located outside of the withdrawable-part rack, the locking device is arranged in an unlatched position. The control rod connected to the locking device is held in a blocked position using the release device.

When the power circuit breaker is inserted in the withdrawable-part rack, the release device is caused by the power circuit breaker, only shortly before the end of the entire displacement path, to move the control rod from a blocked position to a released position. As a result, the locking device connected to the control rod is caused to be moved from its unlatched position to a latched position. As a result, the power circuit breaker is fixed securely in the withdrawable-part rack.

When the power circuit breaker is withdrawn from the withdrawable-part rack, on actuation of the device for moving the power circuit breaker relative to the withdrawable-part rack the control rod is moved from the released position to the blocked position. As a result, the locking device connected to the control rod is moved from its latched position to an unlatched position and releases the power circuit breaker which was up to that point fixed. On further actuation of the device for moving the power circuit breaker relative to the withdrawable-part rack, the now unlatched power circuit breaker is moved out of the withdrawable-part rack. In this case, the control rod is held in the blocked position by way of the release device, and the initial position is reached.

BRIEF DESCRIPTION OF THE DRAWINGS

The invention will be explained in more detail below in an exemplary embodiment with reference to the associated drawings, in which.

DETAILED DESCRIPTION OF THE EXEMPLARY EMBODIMENTS

Figure 1:
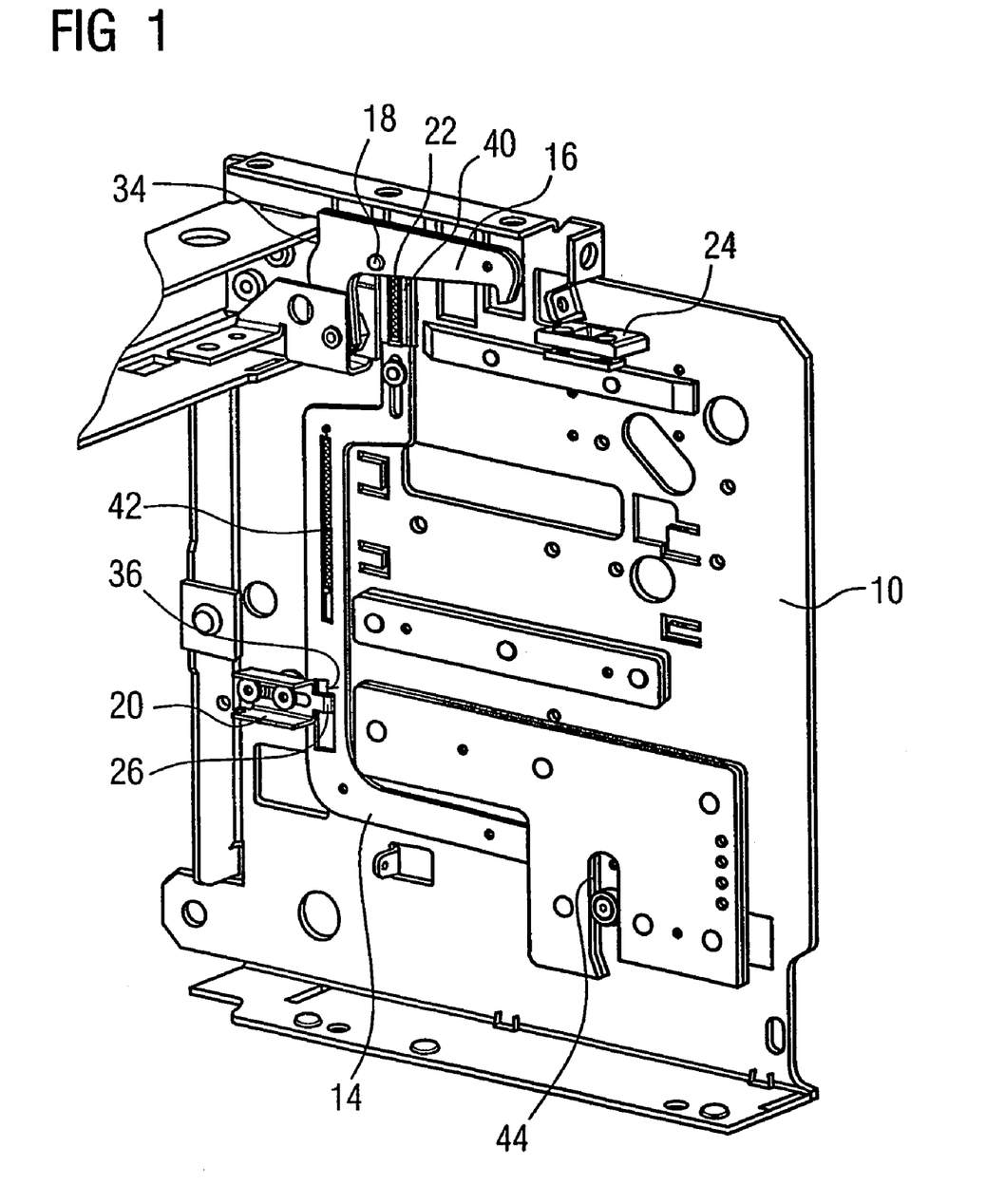
FIG. 1 shows a perspective illustration of a withdrawable-part rack having an apparatus according to an embodiment of the invention in the initial position with the power circuit breaker not inserted.

FIG. 1 shows a perspective illustration of an apparatus according to an embodiment of the invention, which is arranged on a withdrawable-part rack 10, a power circuit breaker 12 being partially inserted in the withdrawable-part rack 10. For greater clarity, only one attachment 24 of the power circuit breaker 12 is illustrated. The apparatus for fixing the power circuit breaker 12 in the withdrawable-part rack 10 is fixed on the side wall of the withdrawable-part rack 10 and engages, in the latched position, in the attachment 24 of the power circuit breaker 12.

In the initial position, the control rod 14 is locked in a blocked position by a transverse slide 20. The result is that a locking device 16 is located in an unlatched position. The power circuit breaker 12 is moved into the withdrawable-part rack 10 by way of a displacement mechanism, which has a crank handle 29 and an insertion shaft 30 having a crankshaft journal 32.

A locking device 16 is located at this point in time in its unlatched position. The locking device 16 is in the form of a hook and is connected in a force-fitting manner to the control rod 14 by way of a bolt 18, a sliding piece 40 and a spring 22. The control rod 14 is arranged on the withdrawable-part rack 10 such that it can move vertically. Furthermore, the control rod 14 has a spring 42 which applies a force, which is directed vertically downwards, to the control rod 14.

The vertical position of the control rod 14 is limited in this initial position by the transverse slide 20, whose blocking tab 26 engages in a notch 36 in the control rod 14 and thus prevents a further vertical downward movement of the control rod 14. As a result, the locking device 16 is prevented from being moved from its unlatched position to a latched position.

The transverse slide 20 likewise has a spring 28 (cf. FIG. 4), by which the transverse slide 20 is pushed in the direction of the notch 36 in the control rod 14. In the initial position, the crankshaft journal 32 is located to the side of the insertion shaft 30.

Figure 2:
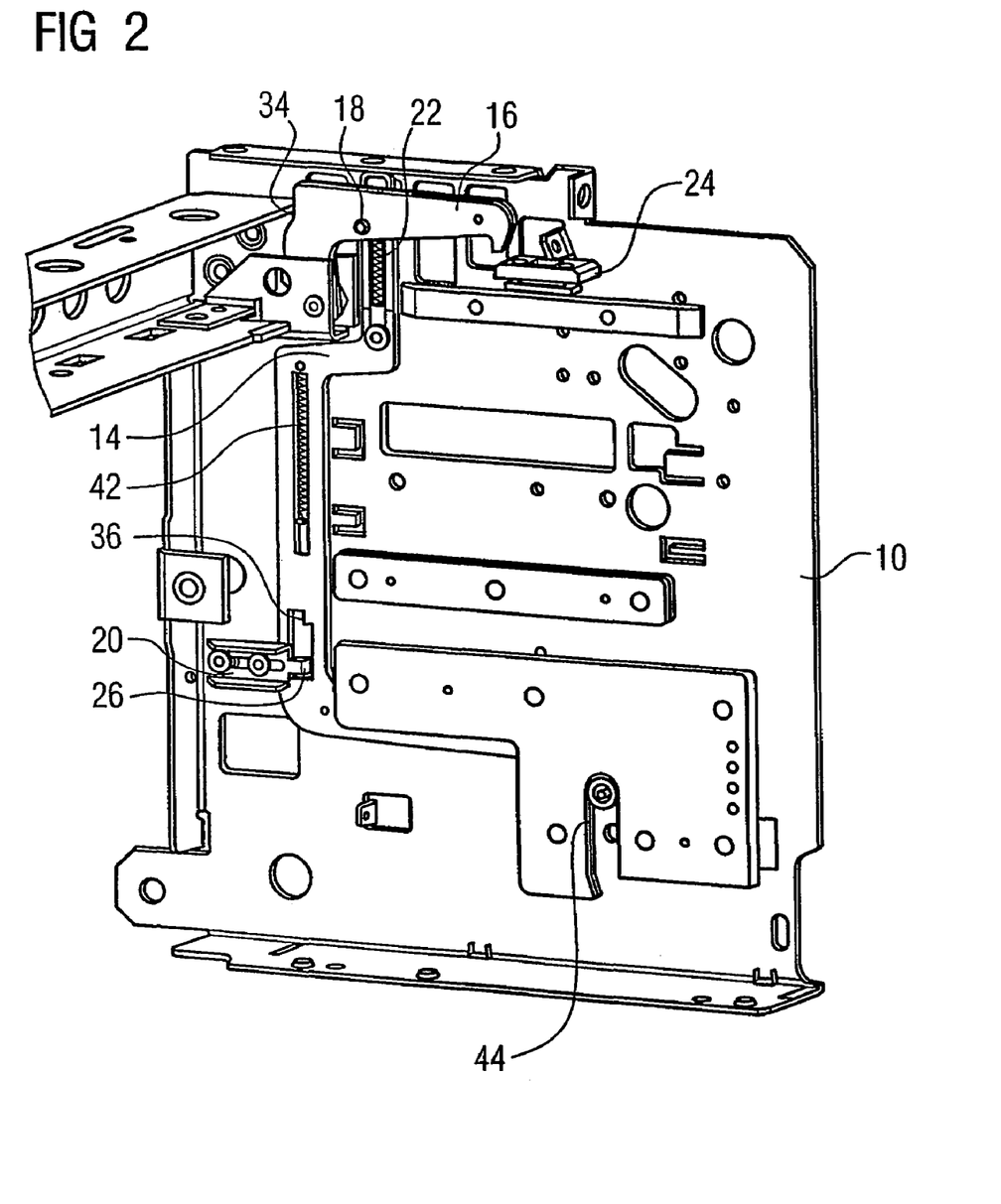
FIG. 2 shows a perspective illustration of a withdrawable-part rack having an apparatus according to an embodiment of the invention during the insertion of the power circuit breaker.

By actuating the displacement mechanism, the crankshaft journal 32 is moved upwards until it is located perpendicularly over the insertion shaft 30 in the insertion guide 44. At the same time, the power circuit breaker 12 is moved into the withdrawable-part rack 10. The control rod 14 is moved upwards by use of the crankshaft journal 32. The locking device 16 is located on a stop 34, and the spring 42 is compressed, as illustrated in FIG. 2.

Figure 3:
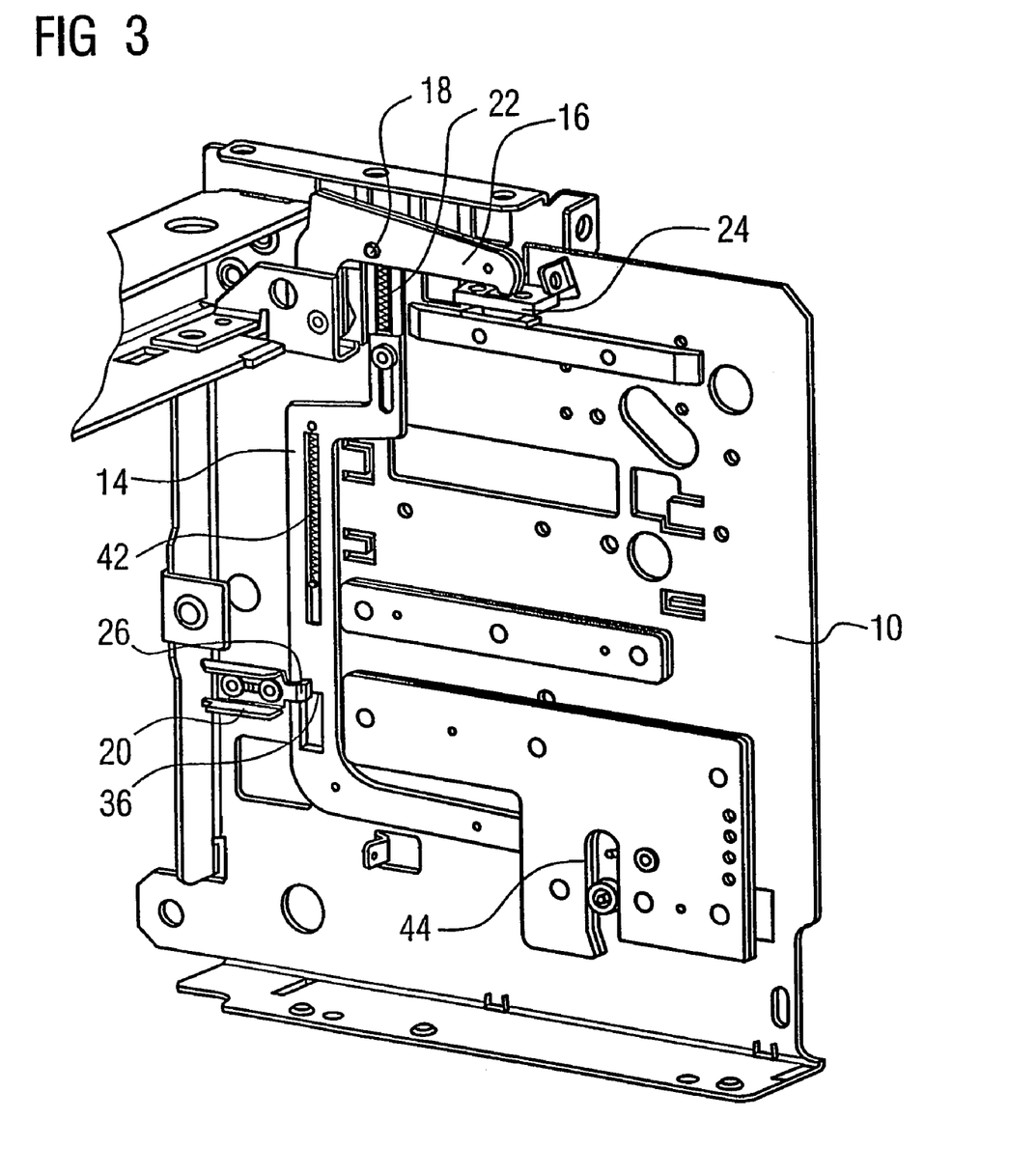
FIG. 3 shows a perspective illustration of a withdrawable-part rack having an apparatus according to an embodiment of the invention with the power circuit breaker inserted and fixed.

On further insertion of the power circuit breaker 12 in the withdrawable-part rack 10, only on the last millimeters of the entire displacement path is the transverse slide 20 moved from a switch foot 38 of the power circuit breaker 12 counter to the spring force of the spring 28. The result is that the transverse slide 20 is deflected rearwards and the left-hand, upper region of the notch 36 and thus the control rod 14 is released, as illustrated in FIG. 3.

The control rod 14 moves downwards as a result of the release with the aid of the spring force of the spring 42. The path of the control rod 14 is limited by the upper edge of the notch 36 or the crankshaft journal 32 of the insertion shaft 30, which has moved downwards again owing to the further insertion. The downward movement of the control rod 14 causes the locking device 16, which is in the form of a hook, to be brought into its end position and to engage in the attachment 24 of the power circuit breaker 12. As a result, the power circuit breaker 12 is fixed securely in the withdrawable-part rack 10.

Aside from the displacement of the power circuit breaker 12 into the withdrawable-part rack 10, no further procedures advantageously need to be performed for the purpose of fixing the power circuit breaker 12. Furthermore, the bearing point of the locking device 16 is selected such that, on the action of tipping forces on the power circuit breaker 12, a closing moment of the hook-shaped locking device in the attachment 24 of the power circuit breaker 12 is always set. The hook thus falls downwards and holds the power circuit breaker 12 securely in the withdrawable-part rack 10.

In order to unlatch and remove the power circuit breaker 12 from the withdrawable-part rack 10, the presence of play between the crankshaft journal 32 and the insertion guide 44 is utilized. Within the first rotations of the crank handle for the insertion shaft 30 on the displacement mechanism, owing to the play no movement is produced on the power circuit breaker 12. On these rotations of the crank handle, the crankshaft journal 32 is moved slightly upwards and lifts the control rod 14 with the locking device 16 connected thereon upwards.

As a result, the locking device 16 is moved from its latched position to an unlatched position. The power circuit breaker 12 is as a result released and can be removed from the withdrawable-part rack 10 by further rotating the crank handle.

On further rotations of the crank handle on the displacement mechanism, the crankshaft journal 32 is moved further upwards in the insertion guide and displaces the power circuit breaker 12. On the resultant upward movement of the control rod 14, the spring 42 of, the control rod 14 is stressed. At the same time, the transverse slide 20 is displaced, owing to the force of the spring element 28, into the notch 36 in the control rod 14 again, as illustrated in FIG. 2. On further rotations of the crank handle, the crankshaft journal 32 is moved downwards again in the insertion guide 44, the spring 42 of the control rod 14 is relieved of stress, and the control rod 14 is again located in the initial position, as illustrated in FIG. 1.

Figure 4:
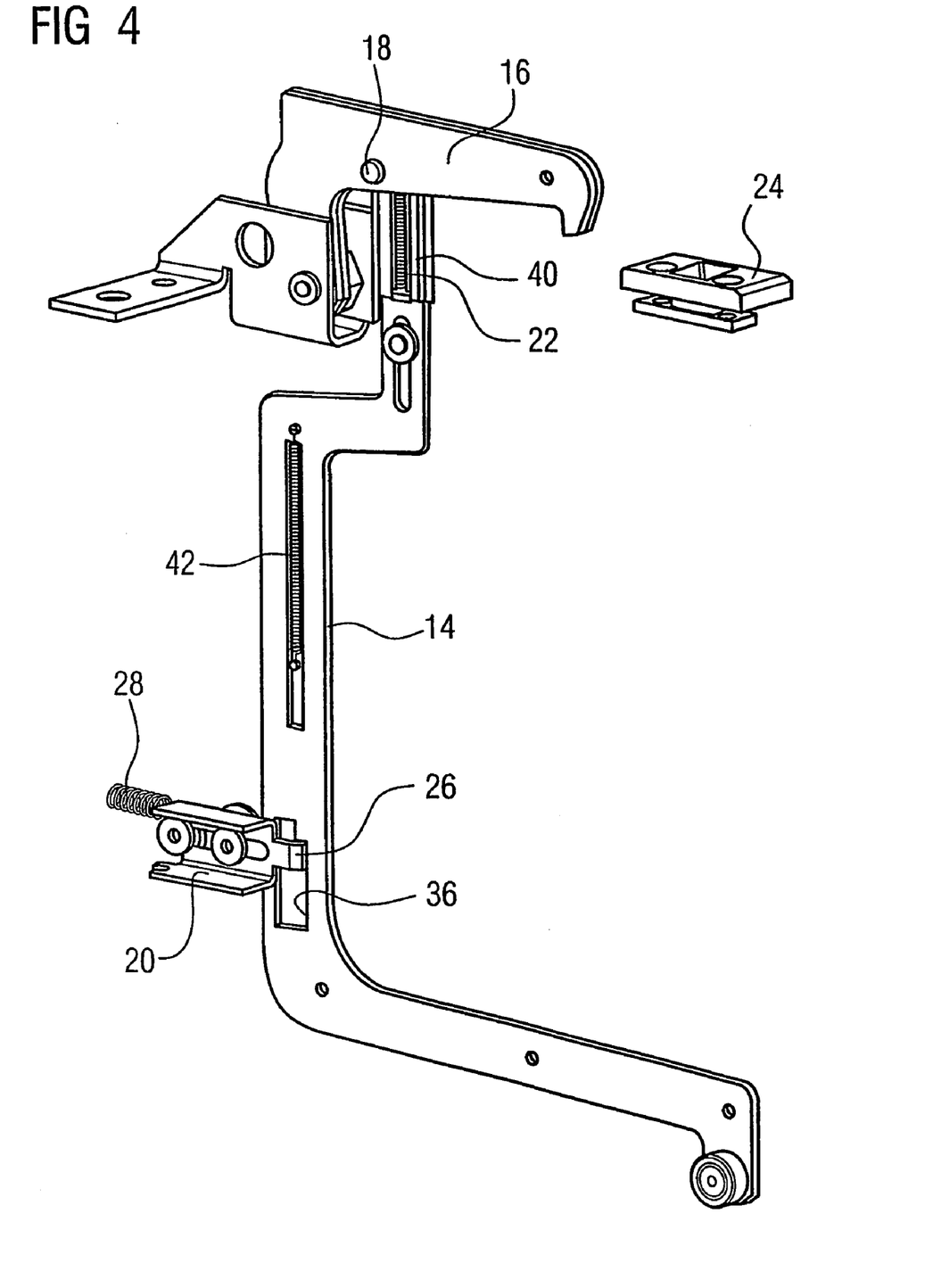
FIG. 4 shows a perspective illustration of an apparatus according to an embodiment of the invention without a withdrawable-part rack.

FIG. 4, in an embodiment of the invention, shows a schematic perspective view of an apparatus without a withdrawable-part rack. In this case, the hook-shaped locking device 16 is connected in a force-fitting manner to the control rod 14 by way of a bolt 18, a sliding piece 40 and a spring 22 and, corresponding to the abovementioned operation, engages in the attachment 24 on displacement into the latched position if the transverse slide 20 releases the control rod 14 by the blocking tab 26 becoming unlatched from the notch 36 in the control rod 14.

Figure 5:
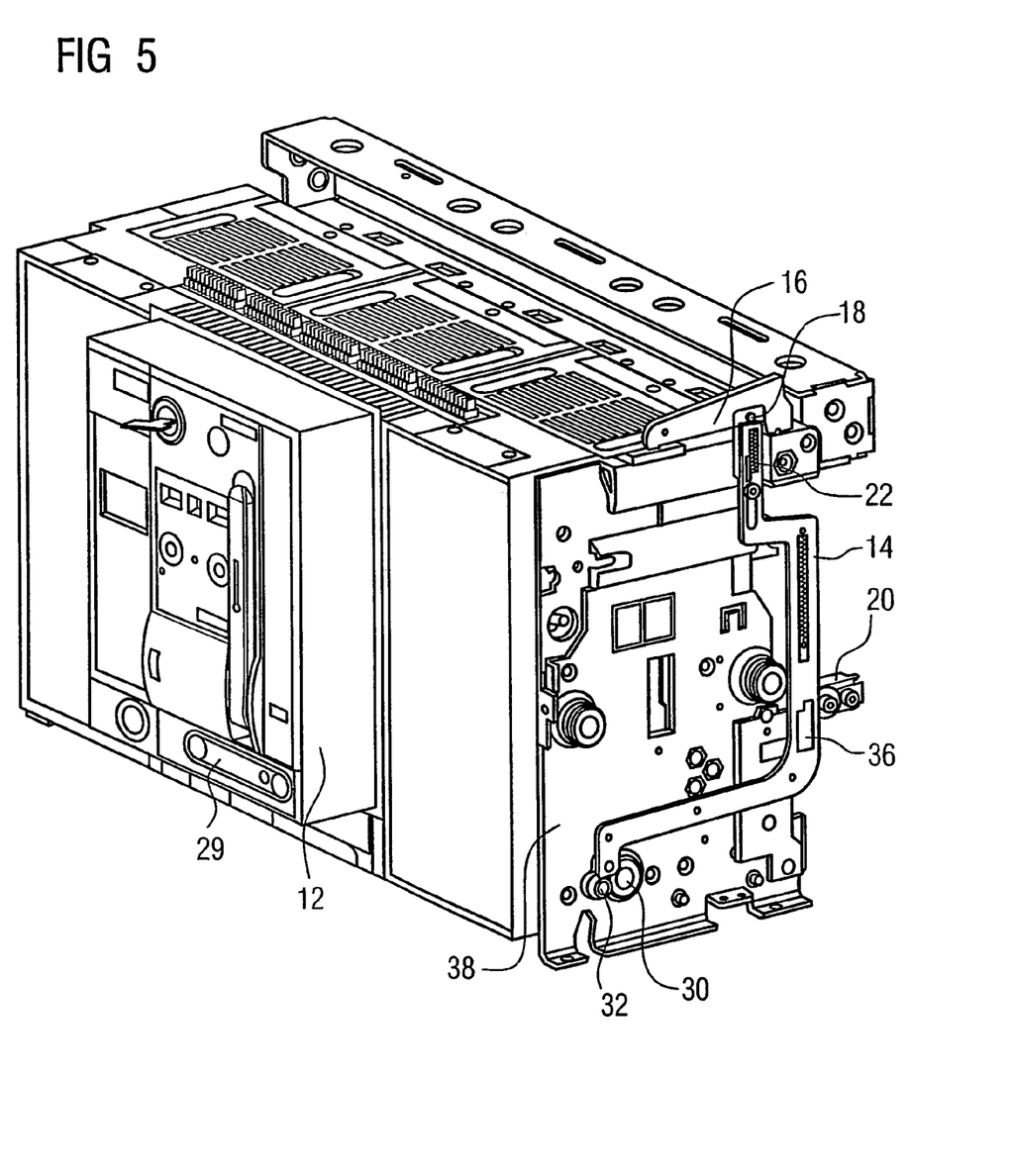
FIGS. 5 and 6 show a perspective illustration of a power circuit breaker, which is fixed in a withdrawable-part rack having an apparatus according to an embodiment of the invention.
Figure 6:
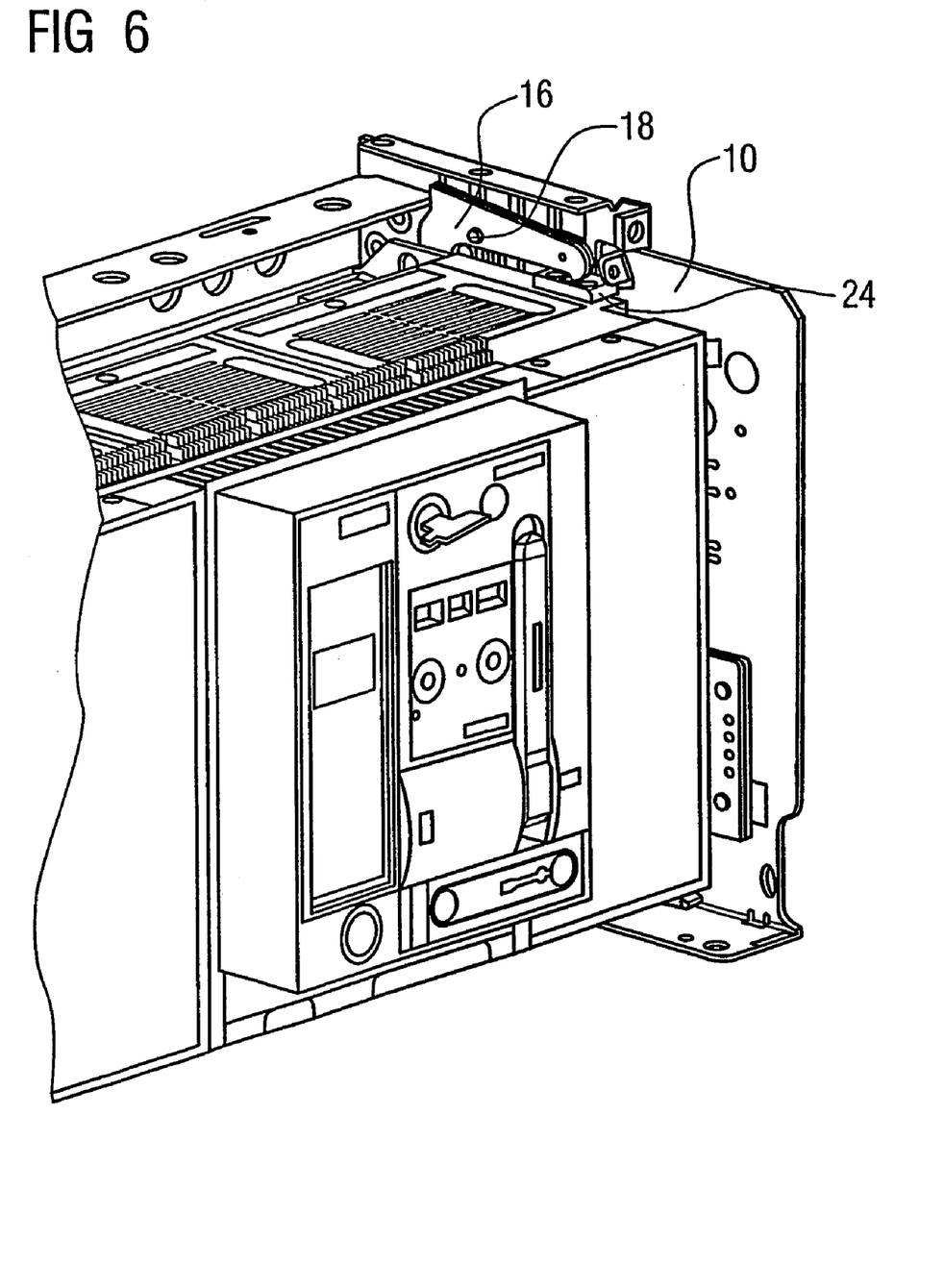

FIGS. 5 and 6 show the apparatus according to an embodiment of the invention for illustrative purposes together with a power circuit breaker 12, which has been completely inserted and fixed in a withdrawable-part rack 10. In both figures, the locking device 16 is located in its latched position.

By actuating the crank handle, the crankshaft journal 32 is moved upwards, as a result of which the control rod 14 likewise experiences a vertical upward movement. Owing to the play between the crankshaft journal 32 and the insertion guide 44 of the displacement mechanism, the power circuit breaker 12 initially does not move. This is not possible until the control rod 14, owing to its vertical upward movement, moves the locking device 16 from the latched position to the unlatched position. As a result, it unlatches the locking device 16 from the attachment 24 of the power circuit breaker 12 and thus the fixing is released.

Exemplary embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

The invention claimed is:

1. An apparatus for fixing a power circuit breaker in a withdrawable-part rack, comprising:
   means for moving the power circuit breaker relative to the withdrawable-part rack;
   at least one locking device, associated with the withdrawable-part rack, for the power circuit breaker, said locking device being connected to a control rod, arranged movably on the withdrawable-part rack, for moving the control rod from at least one of a latched position to an unlatched position and an unlatched position to a latched position, the control rod interacting with the means for moving the power circuit breaker relative to the withdrawable-part rack; and
   a release device, movable by movement of the power circuit breaker, from at least one of a blocked position for the control rod to a released position for the control rod and from a released position to a blocked position, the locking device being adapted to move to the unlatched position when the power circuit breaker is inserted and withdrawn from the withdrawable-part rack, and the control rod being held in the blocked position by the release device, and, when the power circuit breaker is inserted in the withdrawable-part rack, the released position for the control rod for triggering the movement of the locking device to the latched position is assumed by the release device only shortly before the inserted position of the power circuit breaker.

2. The apparatus as claimed in claim 1, wherein the locking device is in the form of a hook.

3. The apparatus as claimed in claim 2, wherein the hook-shaped locking device is rotatably mounted on the withdrawable-part rack and is arranged to be engagable in an attachment locked on the power circuit breaker.

4. The apparatus as claimed in claim 3, wherein the control rod is arranged to be vertically movable on the withdrawable-part rack.

5. The apparatus as claimed in claim 4, wherein a spring is applied to the control rod.

6. The apparatus as claimed in claim 2, wherein the at least one locking device is hook shaped and is connected in a force-fitting manner to the control rod by a bolt, a sliding piece and a spring.

7. The apparatus as claimed in claim 1, wherein the control rod is arranged to be vertically movable on the withdrawable-part rack.

8. The apparatus as claimed in claim 1, wherein a spring is applied to the control rod.

9. The apparatus as claimed in claim 1, wherein the means for moving includes a crank handle and an insertion shaft having a crankshaft journal.

10. The apparatus as claimed in claim 1, wherein the release device is a transverse slide having a blocking tab, adapted to be latched into a notch in the control rod.

11. The apparatus as claimed in claim 10, wherein a spring is applied to the transverse slide.

12. The apparatus as claimed in claim 1, wherein the at least one locking device is hook shaped and is connected in a force-fitting manner to the control rod by a bolt, a sliding piece and a spring.

13. The apparatus as claimed in claim 1, wherein the apparatus includes two locking devices.

14. The apparatus as claimed in claim 13, wherein each locking device is fixed on at least one of the left-hand and right-hand side wall of the withdrawable-part rack.

15. The apparatus as claimed in claim 11, wherein the control rod is fixed on a side wall of the withdrawable-part rack.

16. The apparatus as claimed in claim 1, wherein the control rod is fixed on a side wall of the withdrawable-part rack.

17. The apparatus as claimed in claim 1, wherein the apparatus includes at least two locking devices.

18. The apparatus as claimed in claim 17, wherein each locking device is fixed on at least one of the left-hand and right-hand side wall of the withdrawable-part rack.

19. The apparatus as claimed in claim 18, wherein the control rod is fixed on a side wall of the withdrawable-part rack.

* * * * *